United States Patent [19]
Light et al.

[11] 3,869,524
[45] Mar. 4, 1975

[54] PROCESS FOR THE PRODUCTION OF HEXAMETHYLBENZENE

[75] Inventors: Kenneth K. Light, Asbury Park; James Brian Anglim, Matawan, both of N.J.

[73] Assignee: International Flavors & Fragrances, Inc., New York, N.Y.

[22] Filed: May 1, 1974

[21] Appl. No.: 466,067

[52] U.S. Cl. .......... 260/671 M, 252/522, 260/671 R
[51] Int. Cl. ................................................. C07c 3/50
[58] Field of Search .................... 260/671 R, 671 M

[56] References Cited
UNITED STATES PATENTS

| | | | |
|---|---|---|---|
| 2,976,335 | 3/1961 | Edwards et al. | 260/671 |
| 3,123,650 | 3/1964 | Hutson et al. | 260/671 |
| 3,542,890 | 11/1970 | Earhart et al. | 260/671 |

Primary Examiner—Delbert E. Gantz
Assistant Examiner—C. E. Spresser
Attorney, Agent, or Firm—Arthur L. Liberman, Esq.; Harold Haidt, Esq.

[57] ABSTRACT

A process is described for the preparation of hexamethylbenzene which comprises the step of reacting methyl chloride with one or more of the following materials (hereinafter referred to as "benzene derivative starting material"):
  i. Pentamethylbenzene;
  ii. One or more of the isomers of tetramethylbenzene
  iii. One or more of the isomers of trimethylbenzene;
  iv. One or more of the isomers of xylene;
  v. Toluene; and
  vi. Benzene in a solvent comprising ortho-dichlorobenzene and in the presence of Friedel-Crafts catalyst, at temperatures in the range of from 100° C up to 200° C, the quantity of Friedel-Crafts catalyst being present in the reaction mixture being from 2 up to 10 mole percent based on benzene derivative starting material.

6 Claims, No Drawings

PROCESS FOR THE PRODUCTION OF HEXAMETHYLBENZENE

BACKGROUND OF THE INVENTION

Hexamethylbenzene is a valuable chemical intermediate used in the production of perfumery materials such as 1,2,3,3,4,5,6-heptamethyl bicyclo (2.2.2)-oct-5-en-2-ol as is set forth in U.S. application Ser. No. 402,157 filed on Oct. 1, 1973. In producing such perfumery material, the hexamethylbenzene is first oxidized to 2,3,4,5,6,6-hexamethyl cyclohexa-2,4-dien-1-one which may then be reacted with ethylene to form 1,3,3,4,5,6-hexamethyl bicyclo (2,2,2)-oct-5-en-2-one. This material may be used as such in perfumery or it may be further reacted to form the above-mentioned octenol.

The preparation of hexamethylbenzene by means of alkylation of aromatic compounds with methyl chloride in the presence of an aluminum chloride Friedel-Crafts catalyst is known. One such preparation is described in "Organic Syntheses" Vol. II, Pages 248–51. In the disclosure set forth therein, no solvent is used and large amounts of aluminum chloride are used.

1963, Chemical Abstracts 11297a (Abstract of Mil'-skii Tr. Donetsk. Politekhn. Inst. 53,91–3 (1961)) discloses the formation of hexamethylbenzene by reaction of methyl chloride with xylene using powdered aluminum chloride and running the reaction for a period of 11–13 hours. No solvent is set forth for use with this reaction.

In both the *Organic Synthesis* preparation and the *Chem. Abstracts* preparation, problems are encountered concerning work-up and isolation of the pure product, pure hexamethylbenzene or substantially pure hexamethylbenzene (e.g., of purity greater than 95%).

Friedel-Crafts reactions involving the use of chlorobenzene as a solvent are also known. Theimer, U.S. Pat. No. 3,532,719, issued on Oct. 6, 1970, sets forth a process for producing isochromans which comprises reacting a Friedel-Crafts reactant with an alkylene oxide in the presence of a halogenated aromatic hydrocarbon reaction vehicle such as ortho-dichlorobenzene. It is disclosed at column 3, lines 24–26 that the use of the halogenated aromatic hydrocarbon reaction vehicle facilitates the reaction and provides improved yields. It is also stated therein that the preferred vehicle is monochlorobenzene.

Relatively low yields of hexamethylbenzene are stated to be obtained by reaction of xylene with methyl chloride in the presence of an aluminum chloride catalyst (no specific solvent named), in British Pat. Specification No. 1,255,516 and German Offenlegungschrift No. 1,947,607. The processes of British Pat. Specification No. 1,255,516 and German Offenlegungschrift No. 1,947,607 are directed, however, towards the preparation of tetramethylbenzene rather than the preparation of hexamethylbenzene.

THE INVENTION

The invention accordingly comprises the novel process and steps, specific embodiments of which are also described hereinafter by use of experiments and in accordance with what is now the preferred practice of the invention.

Briefly, the process of this invention comprises reacting with methyl chloride one or more of the following materials:

i. Pentamethylbenzene;
ii. One or more of the isomers of tetramethylbenzene;
iii. One or more of the isomers of trimethylbenzene;
iv. One or more of the isomers of xylene;
v. Toluene; and
vi. Benzene in the presence of from 2 to 10 mole percent (based on benzene derivative starting material) of Friedel-Crafts catalyst, in an orthodichlorobenzene solvent, at a temperature of from 100° C up to 200° C.

The solvent concentration is less than or equal to 500 g of benzene derivative starting material per liter of orthodichlorobenzene solvent.

Our invention lies in the use of the orthodichlorobenzene solvent which offers the following distinct combination of advantages over the processes of the prior art used to produce hexamethylbenzene:

1. Catalytic amounts of aluminum chloride can be used with very little loss of activity;
2. The reaction is rapid; and
3. The hexamethylbenzene product can be crystallized in a pure state directly from the reaction mixture.

Examples of the benzene derivatives which may be used in the reaction of our invention are as follows:

i. Pentamethyl benzene;
ii. 1,2,3,4-tetramethyl benzene;
iii. 1,2,3,5-tetramethyl benzene;
iv. 1,3,4,5-tetramethyl benzene;
v. 1,2,3-trimethyl benzene;
vi. 1,2,4-trimethyl benzene;
vii. 1,2,5-trimethyl benzene;
viii. 1,3,5-trimethyl benzene;
ix. ortho-xylene;
x. meta-xylene;
xi. para-xylene;
xii. toluene; and
xiii. benzene The temperature of reaction, as stated above, may be from 100° C up to 200° C; preferably 140°–180° C.

The pressure of reaction is conveniently one atmosphere. At one atmosphere pressure gaseous methyl chloride is sparged into the reaction mass. At higher pressures, the reaction may be carried out in the liquid phase, methyl chloride being a liquid at such higher pressures over the range of temperatures of our process (100°–200° C)

The Friedel-Crafts catalyst used in our process may be one of the following materials:

i. aluminum chloride;
ii. aluminum bromide;
iii. aluminum iodide;
iv. stannic chloride;
v. stannic bromide;
vi. ferric chloride;
vii. ferric bromide;
viii. borontrifluoride etherate Preferably, the concentration of catalyst is 2-10 mole percent based on the benzene derivative starting material.

The mole ratio of methyl chloride to benzene derivative starting material is a function of the average number of hydrogen atoms on the benzene derivative nucleus which are available to react and be replaced with a methyl moiety. It is preferred that one mole of methyl chloride be introduced into the reaction mass for each available hydrogen atom on the nucleus of the benzene derivative starting material.

The concentration of benzene derivative starting material in the orthodichlorobenzene solvent is 500 g of benzene derivative starting material per liter of orthodichlorobenzene solvent, or less. The preferred concentration of benzene derivative starting material in the solvent is 500 g per liter of orthodichlorobenzene.

During the addition of the methyl chloride gas to the reaction mass, the reaction is monitored by means of gas-liquid chromotography apparatus. At the end of the reaction, the reaction mass is cooled and filtered and the filter cake is preferably washed with an inert solvent such as methyl alcohol. The resulting hexamethylbenzene is useful in preparing a number of materials used in the fragrance industry, as indicated, supra, and as further exemplified herein.

Examples II – VI, and X following, serve to illustrate embodiments of our invention as it is now preferred to practice it. Examples VII – IX, following, illustrate the utility of the product produced according to the process of our invention. Example I illustrates the disadvantage of using a solvent other than orthodichlorobenzene in the reaction mass to produce hexamethylbenzene. It will be understood that these examples are illustrative and the invention is to be considered restricted thereto only as indicated in the appended claims.

EXAMPLE I 222 g (1.5 moles) pentamethylbenzene and 500 ml chlorobenzene are added with stirring in a 1-liter three neck flask to 85° C. At 85° C, 10 g of aluminum chloride is added over a period of 2 minutes in small portions. Five minutes later, when the temperature reaches 100° C addition of methyl chloride gas is commenced via a gas dispersion tube at a rate of 600 ml per minute. The reaction is monitored on GLC as follows:

| Sample Number | Time (after start of Addition of Methyl Chloride) | Temperature | Liters of Methyl Chloride Gas Added |
|---|---|---|---|
| 1 | 5 minutes | 128°C | 3 |
| 2 | 15 minutes | 128°C | 9 |
| 3 | 25 minutes | 128°C | 15 |
| 4 | 30 minutes | 128°C | 18 |
| 5 | 43 minutes | 128°C | 26 |
| 6 | 56 minutes | 128°C | 34 |
| 7 | 66 minutes | 128°C | 40 |
| 8 | 76 minutes | 128°C | 46 |
| 9 | 80 minutes | 128°C | 48 |
| 10 | 83 minutes | 128°C | 50 |
| 11 | 89 minutes | 128°C | 53 |
| 12 | 110 minutes | 128°C | 66 |
| 13 | 120 minutes | 128°C | 72 |
| 14 | 130 minutes | 128°C | 78 |
| 15 | 136 minutes | 128°C | 81 |
| 16 | 148 minutes | 128°C | 93 |
| 17 | 189 minutes | 128°C | 112 |
| 18 | 209 minutes | 128°C | 125 |
| 19 | 214 minutes | 128°C | 128 |
| 20 | 224 minutes | 128°C | 134 |

GLC Analysis

| | Results Pentamethylbenzene | Hexamethylbenzene |
|---|---|---|
| Sample 1 shows | 87.4% | 12.6% |
| Sample 2 shows | 81.2% | 18.8% |
| Sample 3 shows | 79.0% | 21.0% |
| Sample 4 shows | 69.5% | 30.5% |
| Sample 5 shows | 58.8% | 37.5% |
| Sample 6 shows | 58.1% | 41.9% |
| Sample 7 shows | 53.9% | 46.0% |
| Sample 8 shows | 47.1% | 52.7% |
| Sample 9 shows | 41.4% | 52.5% |
| Sample 10 shows | 39.7% | 55.3% |
| Sample 11 shows | 37.8% | 57.8% |
| Sample 12 shows | 34.9% | 59.2% |
| Sample 13 shows | 33.5% | 60.8% |
| Sample 14 shows | 32.2% | 63.5% |
| Sample 15 shows | 29.2% | 66.0% |
| Sample 16 shows | 24.6% | 68.5% |
| Sample 17 shows | 18.1% | 74.6% |
| Sample 18 shows | 16.4% | 79.1% |
| Sample 19 shows | 13.7% | 79.2% |
| Sample 20 shows | 12.0% | 78.1% |

Immediately subsequent to taking each of samples 3, 8, 14 and 18, aluminum chloride in the amount of 10 grams is added each time (total: 40 grams additional $AlCl_3$).

EXAMPLE II 89 g (0.60 moles) pentamethylbenzene and 200 ml orthodichlorobenzene are stirred in a 500 ml three necked flask and the mixture is heated to 170° C. Aluminum chloride (4.0 g) is added carefully as the temperature reaches 150° C. When the temperature reaches 170° C, the methyl chloride gas addition is started via a gas dispersion tube, at a rate of 600 ml per minute. The reaction is monitored on GLC (one-eighth inch × 10 feet, 10% SE 30 at 205° C isothermal) as follows:

| Sample Number | Time (after start of methyl chloride gas addition) | Liters Methyl Chloride Gas Added | GLC Analysis Results | |
|---|---|---|---|---|
| | | | Pentamethylbenzene | Hexamethylbenzene |
| 1 | 5 minutes | 0.13 | 64% | 36% |
| 2 | 15 minutes | 0.40 | 55% | 45% |
| 3 | 25 minutes | 0.69 | 28% | 72% |
| 4 | 35 minutes | 0.94 | 18% | 82% |
| 5 | 45 minutes | 1.20 | 11% | 89% |
| 6 | 55 minutes | 1.47 | 6% | 94% |

At the end of the 55 minute period, the resulting mixture is cooled to 70° C. 250 ml of water is added with stirring. The resulting mixture is re-heated to 95° C and is placed in a separatory funnel. Separation of the layers is then carried out, and the organic layer is cooled to −10° C. Filtration of the resulting solid and washing with cold methanol gives a material containing 98.2% hexamethylbenzene and 1.8% pentamethylbenzene having a weight of 55 g.

EXAMPLE III 223 g pentamethylbenzene and 500 ml orthodichlorobenzene are heated to 127° C in a one liter three necked flask. 10 g aluminum chloride is added with heating continuing. Then, 1 minute later, the methyl chloride gas addition is started, via a gas dispersion tube, at a rate of 600 ml per minute. The reaction is periodically monitored on GLC (one-eighth inch × 10 feet, 10% SE 30 at 210° C isothermal) as follows:

| Time (Min.) | Liters of Methyl Chloride Gas Added | Temperature | GLC Analysis Results | |
|---|---|---|---|---|
| | | | Penta-methyl-benzene | Hexa-methyl-benzene |
| 5 | 3 | 145°C | 74.7% | 25.3% |
| 17 | 10 | 142°C | 64.6% | 35.4% |
| 35 | 21 | 145°C | 50.8% | 49.2% |
| 45 | 27 | 144°C | 44.7% | 55.3% |
| 66 | 41 | 143°C | 33.3% | 68.7% |
| 95 | 57 | 140°C | 29.4% | 70.6% |
| 108 | 65 | 138°C | 28.3% | 71.7% |
| 120 | 72 | 145°C | 17.9% | 81.3% |
| 133 | 80 | 145°C | 12.5% | 85.9% |
| 150 | 90 | 145°C | 6.4% | 91.7% |
| 159 | 95 | 145°C | 5.1% | 93.0% |

At the end of the 159 minute period, the mixture is cooled to 0° C and is filtered. The filtrate is put aside and the resulting solid is washed twice with cold methanol (100 ml portions). The filter cake is dried (weight 161 g). The orthodichlorobenzene filtrate is then cooled to −10° C and re-filtered. The resulting solid is washed with methanol and dried (weight 4 g). GLC analysis indicates that the resultant solid is 98.8% hexamethylbenzene.

EXAMPLE IV 180 g 1,3,5-trimethylbenzene (1.50 moles) and 500 ml dichlorobenzene are placed in a one liter three necked flask equipped with stirrer, thermometer, reflux condenser and gas dispersion tube. The mixture is heated and stirred. At 128° C, the aluminum chloride is added. One minute later, at 135° C, the methyl chloride gas addition is started, at a rate of 600 ml per minute. The temperature is maintained at 140°–146° C during the addition, and the reaction is periodically monitored on GLC (one-eighth inch × 10 feet, 10% SE 30 programmed from 80° C to 200° C at 16° C per minute) as follows:

| Addition Time | Liters of Methyl Chloride Gas Added | GLC Analysis Results | | | Additional Aluminum Chloride |
|---|---|---|---|---|---|
| | | Tetra-Methyl Benzene | Penta-Methyl Benzene | Hexa-Methyl Benz. | |
| 21 minutes | 12.6(0.56 moles) | 68.1 | 8.9 | — | 23.0 |
| 51 minutes | 30.6(1.37 moles) | 64.1 | 21.7 | 8.2 | 6.0 |
| 81 minutes | 48.6(2.17 moles) | 44.8 | 40.6 | 14.6 | — |
| 118 minutes | 70.8(3.16 moles) | 29.2 | 35.5 | 35.3 | — |
| 145 minutes | 87.0(3.88 moles) | — | 30.3 | 61.5 | — |
| 181 minutes | 108.6(4.85 moles) | — | 23.1 | 76.1 | — |
| 208 minutes | 124.8(5.57 moles) | — | 14.8 | 84.2 | — |
| 235 minutes | 141.0(6.29 moles) | — | 8.2 | 91.2 | — |
| 265 minutes | 159.0(7.10 moles) | — | 4.4 | 94.6 | — |

The methyl chloride addition rate indicates a range of 600–675 ml/minute. The resulting mixture is cooled, with stirring, to 0° C. The reaction mass is filtered and the resulting solid filter cake is washed twice with 100 ml portions of cold methanol. The filter cake is then washed with another 50 ml of cold methanol. The resulting solid is air dried, yielding 160.5 g of material which on analysis, using GLC, is 98.4% hexamethylbenzene (66% of theoretical yield).

EXAMPLE V 10 g aluminum chloride is added to 159 g m-xylene (1.5 mole) and 375 ml orthodichlorobenzene in a one liter flask at room temperature. The mixture is heated to 138° C, and methyl chloride gas addition is started. The methyl chloride gas addition is carried out at 138°–148° C at 600 ml per minute. The reaction is monitored on GLC (one-eighth inch × 10 feet, 10% SE 30 (80°–220° C at 16° per minute) as follows:

| Sample Number | Addition Time | Liters of Methyl Chloride Gas Added |
|---|---|---|
| 1 | 80 minutes | 48 |
| 2 | 120 minutes | 72 |
| 3 | 180 minutes | 108 |
| 4 | 240 minutes | 144 |
| 5 | 270 minutes | 162 |
| (5 g of aluminum chloride is added at this point) | | |
| 6 | 330 minutes | 198 |
| 7 | 360 minutes | 216 |

| Sample Number | Analysis | | | | |
|---|---|---|---|---|---|
| | Xylene | Trimethyl Benzene | Tetra-methyl Benzene | Penta-Methyl Benzene | Hexa-methyl Benzene |
| 1 | 9.7% | 12.1% | 66.1% | 9.7% | 0% |
| 2 | 0% | 2.7% | 67.2% | 28.5% | 0% |
| 3 | 0% | 0% | 5% | 77.0% | 18% |
| 4 | 0% | 0% | 0% | 32.0% | 68% |
| 5 | 0% | 0% | 0% | 32.0% | 68% |
| 6 | 0% | 0% | 0% | 6.0% | 94% |
| 7 | 0% | 0% | 0% | 4.0% | 95% |

The methyl chloride addition is halted at the end of the 360 minute period and the mixture is slowly cooled to 10° C and then filtered. The flask is washed with 150 ml of methanol. This is used to wash the filter cake. A total of four methanol washes of the filter cake is carried out as follows: three 100 ml washes and then one 50 ml wash. The resulting solid is then dried yielding 129 g of material analyzed as 98% pure hexamethylbenzene.

EXAMPLE VI 15 g anhydrous ferric chloride is added to 117 g benzene (1.5 moles) and 375 ml dichlorobenzene in a 1 liter flask at room temperature. The mixture is heated to 138° C, and methyl chloride gas addition is started. The methyl chloride gas addition is carried out at 138°–148° C at 650 ml per minute.

| Addition Time | Liters of Methyl Chloride Gas Added |
|---|---|
| 80 minutes | 48 |
| 120 minutes | 72 |
| 180 minutes | 108 |

-Continued

| Addition Time | Liters of Methyl Chloride Gas Added |
| --- | --- |
| 240 minutes | 144 |
| 270 minutes | 162 |
| 330 minutes | 198 |
| 360 minutes | 216 |

The methyl chloride gas addition is halted after 360 minutes and the mixture is slowly cooled to 10° C, then is filtered. The flask is washed with 150 ml of methanol. This is used to wash the filter cake. A total of four methanol washes of the filter cake is carried out as follows: three 100 ml washes and then one 50 ml wash. The resulting solid is then dried yielding 110 g of material analyzed as 97% pure hexamethylbenzene.

EXAMPLE VII

Preparation of 2,3,4,5,6,6-Hexamethylcyclohexa-2,4-dien-1-one

A three-liter reaction flask is charged with 360 ml of acetic anhydride cooled to −5° C, and 90 ml of concentrated sulfuric acid is added slowly while maintaining the temperature of the solution below 0° C. Thereafter, 84 ml of 30 percent hydrogen peroxide is added at −5° C during 25 minutes. The resulting white slurry is dissolved in 250 ml of methylene chloride.

The methylene chloride solution is added dropwise in 3 minutes at 0° C to a solution of 80 g of hexamethylbenzene (produced according to the process of Example V), 300 ml of methylene chloride, 360 ml of acetic acid, and 270 ml of concentrated sulfuric acid. The mixture is stirred at 0°-5° C for 90 minutes and the resulting yellow solution is poured into 1,500 ml of ice-water.

The aqueous layer is separated and extracted three times with 500 ml portions of methylene chloride. The combined methylene chloride layer and extracts are washed twice with 1-liter portions of water, once with 1-liter of 5 percent aqueous sodium hydroxide solution, once with 1-liter of saturated ferrous ammonium sulfate solution, and twice more with water. The methylene chloride solution is dried over magnesium sulfate and distilled from the filtered solution to give 85 g of a slightly yellow oil.

Fractional distillation over a twelve-inch Vigreaux column gives 76.0 g of 2,3,4,5,6,6-hexamethylcyclohexa-2,4-dien-1-one boiling at 75°-90° C at 0.5 mm Hg.

The infrared spectrum of 2,3,4,5,6,6-hexamethylcyclohexa-2,4-dien-1-one shows absorptions at 2,880–2,980, 1,620–1,660, 1,560–1,540 (shoulder), 1,450, 1,370, 1,335, 1,285, 1,262, 1,215, 1,100, 1,070, 1,060, 985, 945, 900, 790, 630 and 600 cm$^{-1}$.

The nuclear magnetic resonance (NMR) spectrum (CDCl$_3$) shows a 6H singlet at 1.14, and a 3H singlet at 2.02. The mass spectrum exhibits a molecular ion at m/e (ratio of mass to charge) of 178.

EXAMPLE VIII

Preparation of 1,3,3,4,5,6-Hexamethylbicyclo-(2.2.2)-oct-5-en-2-one

A solution of 70 g of 2,3,4,5,6,6-hexamethylcyclohexa-2,4-dien-1-one in 300 ml of benzene is placed in a two-liter Parr stirred autoclave and the air is removed by passing ethylene through the reaction vessel. Ethylene is charged to obtain a 180 psig (pounds per square inch, gauge) pressure at room temperature and then heated at 200° C for 2½ hours. The internal pressure increases to a maximum of 400 psi and drops to 340 psi. After cooling to room temperature the benzene is distilled under reduced pressure to give 85 g of a light yellow oil.

This material has a woody, pine cone, warm aroma.

The infrared spectrum of the 1,3,3,4,5,6-hexamethylbicyclo-(2.2.2)-oct-5-en-2-one exhibits absorptions at 2,860–2,970, 1,710, 1,470, 1,455, 1,440, 1,380, 1,375, 1,370, 1,355, 1,260, 1,230, 1,205, 1,140, 1,100, 1,062, 1,055, 1,030 and 1,010 cm$^{-1}$. The NMR spectrum shows singlet methyl signals at 0.88, 0.93, 1.07 and 1.12. The C-5 and C-6 methyls appear at 1.70 and 1.62 respectively. The mass spectrum shows a molecular ion at m/e 206.

EXAMPLE IX

Preparation of 1,2,3,3,4,5,6-Heptamethylbicyclo-(2.2.2)-oct-5-en-2-ol

A three molar solution (170 ml) of methyl magnesium chloride in tetrahydrofuran is heated to reflux under nitrogen and a solution of 85 g of 1,3,3,4,5,6-hexamethylbicyclo-(2.2.2)-oct-5-en-2-one in 250 ml of tetrahydrofuran is added dropwise over a 20-minute period and the reaction mixture is refluxed under nitrogen for an additional 2 hours. An extra 50 ml of methyl magnesium chloride in 50 ml of tetrahydrofuran is added and the reaction mixture refluxed for 12 hours.

The excess Grignard reagent and salts are then hydrolyzed with saturated ammonium chloride solution, added slowly with ice bath cooling, and the tetrahydrofuran solution is decanted from the salts. The tetrahydrofuran is distilled from the product under reduced pressure to yield 75 g of yellow oil. The crude alcohol is distilled over a 12-inch Goodloe packed column at a 4:1 reflux ratio, and a product boiling at 80°-87° C at 0.5 mm Hg is collected. Recrystallization of the solid fractions from hexane provides a white crystalline solid melting at 72°-73° C.

The solid has an excellent woody, camphoraceous odor and is quite similar to patchouli alcohol.

Gas-liquid chromatographic (GLC) analysis of the recrystallized product shows the presence of two epimeric alcohols, A (Compounds IIa and IIa') and B (Compounds IIb and IIb'), in the ratio of 1:12.5. The structures of these compounds are as follows:

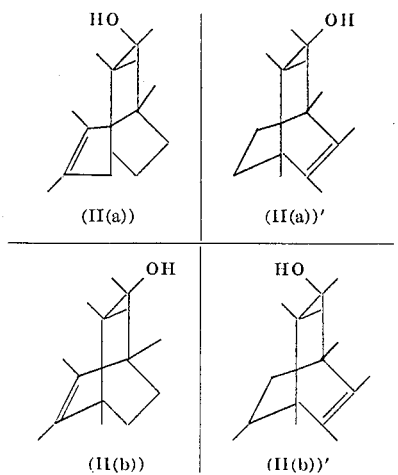

The infrared spectrum of the major alcohol A exhibits absorptions at 3,630, 3,520, 2,860–3,000, 1,470, 1,440, 1,390, 1,383, 1,379, 1,368, 1,300, 1,190, 1,180, 1,150, 1,118, 1,099, 1,078, 1,059, 1,050, 1,000, 986, 907 and 798 cm$^{-1}$. In the NMR spectrum of the major component (A) five methyl (3H) singlets appear at 0.95, 1.27, 1.38, 1.46, and 1.68. A methyl singlet (6H) appears at 2.82. The mass spectrum of A shows a molecular ion at m/e 222.

The infrared spectrum of the minor alcohol component (B) exhibits absorptions at 3,580, 3,510, 2,860–3,000, 1,470, 1,440, 1,390, 1,378, 1,362, 1,316, 1,297, 1,242, 1,210, 1,184, 1,145, 1,119, 1,098, 1,075, 1,060, 1,050, 1,040, 1,030, 1000, 910, 880, 800, 740, 708, 680, 615 and 580 cm$^{-1}$. The NMR spectrum of the minor component (B) shows methyl singlets (3H) at 0.86, 1.23, 1.46, 1.55, 1.60, 2.88, and 2.93. The mass spectrum shows a molecular ion at m/e 222.

EXAMPLE X

A mixture of 220 g. of pentamethylbenzene, 500 ml of ortho-dichlorobenzene and 15 g. of stannic chloride are mixed in a 1-liter three neck flask and heated to 140° C. Methyl chloride gas is added at a rate of about 600 ml per minute. After 2½ hours of gas addition GLC shows that there is in the mixture 94% hexamethylbenzene and 4.5% pentamethylbenzene. The mixture is cooled to 10° C and filtered. The filter cake is washed three times with 100 ml portions of methanol and dried, yielding about 150 g. of hexamethylbenzene which analyzes greater than 97% pure by GLC.

What is claimed is:

1. A process for preparing hexamethylbenzene comprising the step of intimately admixing methyl chloride and a benzene derivative starting material selected from the group consisting of:
   i. Pentamethyl benzene;
   ii. Tetramethyl benzene;
   iii. Trimethyl benzene;
   iv. Xylene;
   v. Toluene; and
   vi. Benzene and mixtures thereof in the presence of a solvent comprising a preponderance of orthodichlorobenzene, and a Friedel-Crafts catalyst at a temperature in the range of from 100° C up to 200° C and a benzene derivative starting material concentration in the orthodichlorobenzene of less than about 500 g per liter.

2. The process of claim 1 wherein the Friedel-Crafts catalyst is aluminum chloride.

3. The process of claim 1 comprising the additional steps of filtering the hexamethylbenzene from the reaction mass, recovering the filter cake and washing said filter cake with methanol.

4. The process of claim 1 wherein the benzene derivative starting material is pentamethylbenzene.

5. The process of claim 1 wherein the benzene derivative starting material is 1,3,5-trimethyl benzene.

6. The process of claim 1 wherein the benzene derivative starting material is xylene.

* * * * *